United States Patent
Elimaleh et al.

(10) Patent No.: US 12,503,138 B2
(45) Date of Patent: Dec. 23, 2025

(54) HOT SPOT DETECTION AND REPORTING SYSTEM

(71) Applicant: Mobileye Vision Technologies Ltd., Jerusalem (IL)

(72) Inventors: Yaniv Elimaleh, Jerusalem (IL); Samantha Walter, Herzliya (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 84 days.

(21) Appl. No.: 18/245,464

(22) PCT Filed: Dec. 16, 2022

(86) PCT No.: PCT/IB2022/062373
§ 371 (c)(1),
(2) Date: Mar. 15, 2023

(87) PCT Pub. No.: WO2023/119091
PCT Pub. Date: Jun. 29, 2023

(65) Prior Publication Data
US 2024/0286644 A1   Aug. 29, 2024

Related U.S. Application Data

(60) Provisional application No. 63/292,243, filed on Dec. 21, 2021.

(51) Int. Cl.
*B60W 60/00*   (2020.01)
*G06F 3/01*    (2006.01)

(52) U.S. Cl.
CPC ......... *B60W 60/0015* (2020.02); *G06F 3/013* (2013.01); *B60W 2520/06* (2013.01);
(Continued)

(58) Field of Classification Search
CPC ....... B60W 60/0015; B60W 2540/225; B60W 2555/20; B60W 2554/802; B60W 2520/06; B60W 2520/10; G06F 3/013
(Continued)

(56) References Cited

U.S. PATENT DOCUMENTS 12,243,429 B2 *  3/2025 Merwaday .............. H04W 4/46
2013/0033368 A1  2/2013 Fukamachi
(Continued)

FOREIGN PATENT DOCUMENTS

CN   111587407 B  *  1/2024 .......... B60W 50/023
EP   3260344 A1    12/2017
(Continued)

OTHER PUBLICATIONS

Hu, Hao et al. "TripSense: A Trust-Based Vehicular Platoon Crowdsensing Scheme with Privacy Preservation in VANETs." Sensors (Basel, Switzerland) 16.6 (2016): 803-803. Web. (Year: 2016).*
(Continued)

*Primary Examiner* — Matthias S Weisfeld
*Assistant Examiner* — Keith A von Volkenburg
(74) *Attorney, Agent, or Firm* — Banner & Witcoff, Ltd.

(57) ABSTRACT

Techniques are disclosed for an unsafe hot spot detection and reporting system to identify unsafe "hotspot" zones. The system functions to identify hotspot zones that are associated with an increased number of detected warnings regarding unsafe conditions, vehicle collisions, near misses, or other hazardous events. The hotspots are determined based upon historical data that may include safety-based warnings issued from vehicle with respect to in-vehicle monitoring data or other data sources. The system leverages the hotspot location information to identify a safety data model (SDM) rule and automatically adjust one or more safety data model (SDM) parameters of the SDM rule such as follow distance,
(Continued)

speed settings, etc., and/or to route the vehicle to an alternate course to avoid an identified unsafe hotspot zone.

25 Claims, 5 Drawing Sheets

(52) U.S. Cl.
CPC ... *B60W 2520/10* (2013.01); *B60W 2540/225* (2020.02); *B60W 2554/802* (2020.02); *B60W 2555/20* (2020.02)

(58) Field of Classification Search
USPC .......................................................... 701/26
See application file for complete search history.

(56) References Cited

U.S. PATENT DOCUMENTS

| | | | | |
|---|---|---|---|---|
| 2016/0171521 | A1* | 6/2016 | Ramirez | G06Q 10/04 |
| | | | | 701/409 |
| 2017/0372431 | A1* | 12/2017 | Perl | G06Q 10/047 |
| 2018/0154903 | A1* | 6/2018 | Song | B60W 60/0059 |
| 2018/0174485 | A1* | 6/2018 | Stankoulov | G09B 19/167 |
| 2018/0239359 | A1 | 8/2018 | Jian | |
| 2019/0102840 | A1* | 4/2019 | Perl | G06Q 40/08 |
| 2019/0108753 | A1 | 4/2019 | Kaiser et al. | |
| 2019/0383631 | A1* | 12/2019 | Bigio | G06V 20/59 |
| 2020/0327804 | A1* | 10/2020 | Xu | G08G 1/095 |
| 2021/0088784 | A1* | 3/2021 | Whitmire | G02B 27/0101 |
| 2021/0141093 | A1* | 5/2021 | Kim | G05D 1/0231 |
| 2021/0217307 | A1* | 7/2021 | Abdel-Aty | G08G 1/0116 |
| 2021/0264794 | A1* | 8/2021 | Merwaday | B60W 30/16 |
| 2021/0300418 | A1* | 9/2021 | Alvarez | G08G 1/096791 |
| 2021/0309261 | A1* | 10/2021 | Rosales | B60W 60/001 |
| 2022/0003556 | A1* | 1/2022 | Lawrence | G01C 21/28 |
| 2022/0365530 | A1* | 11/2022 | Foster | G05D 1/0022 |
| 2023/0154204 | A1* | 5/2023 | Kahn | G06V 20/44 |
| | | | | 382/104 |
| 2024/0043025 | A1* | 2/2024 | Di Lillo | G06F 30/20 |

FOREIGN PATENT DOCUMENTS

| | | |
|---|---|---|
| GB | 2528084 A | 1/2016 |
| WO | 2021094148 A1 | 5/2021 |

OTHER PUBLICATIONS

"A Review on Key Challenges in Intelligent Vehicles: Safety and Driver-oriented Features." IET intelligent transport systems n. pag. Web. (Year: 2021).*

Mar. 6, 2023 (PCT) International Search Report and Written Opinion—App. PCT/IB2022/062373.

* cited by examiner

| ID | Vehicle Type | Timestamp | Vehicle Data | Environmental Data | Geolocation Coordinates | Warning Details |
|---|---|---|---|---|---|---|
| ID 1 | Light Truck | 9/30/2022 8:32 | Heading 12°, 42 kph | Clear, 19° C | 41.875768, -87.624473 | Following too close; braking applied |
| ID 2 | Passenger | 9/30/2022 9:32 | Heading 16°, 56 kph | Light rain, 18° C | 41.874444, -87.624684 | VRU warning; braking applied |
| ID 3 | Semi truck | 5/4/2022 17:22 | Heading 190°, 48 kph | Light rain, 7° C | 41.874531, -87.624092 | Following too close; braking applied |
| ID 4 | Light Truck | 8/15/2022 2:15 | Heading 192°, 51 kph | Clear, 28° C | 41.874651, -87.623914 | VRU warning; braking applied |
| ID 5 | Passenger | 1/1/2022 6:01 | Heading 14°, 66 kph | Clear, -15° C | 41.874437, -87.624990 | Slippery conditions detected; speed reduced |
| ID 6 | Passenger | 2/3/2022 21:45 | Heading 15°, 40 kph | Light snow, -9° C | 41.874444, -87.624877 | VRU warning; braking applied |

```
┌─────────────────────────────────────────┐
│   Determine a location of a vehicle     │
│                 502                     │
└─────────────────────────────────────────┘
                    │
                    ▼
┌─────────────────────────────────────────┐
│ Identify one or more hotspot locations  │
│ based upon safety-based warnings        │
│ previously issued by other vehicles at  │
│ a location that meet a predefined       │
│ criterion                               │
│                 504                     │
└─────────────────────────────────────────┘
                    │
                    ▼
┌─────────────────────────────────────────┐
│ Determine a safety driving model rule   │
│ identified with the safety-based        │
│ warnings                                │
│                 506                     │
└─────────────────────────────────────────┘
                    │
                    ▼
┌─────────────────────────────────────────┐
│ Generate one or more trigger signals    │
│ based upon the SDM rule and the         │
│ location of the vehicle with respect to │
│ the hotspot location                    │
│                 508                     │
└─────────────────────────────────────────┘
                    │
                    ▼
┌─────────────────────────────────────────┐
│ Adjust one or more SDM parameters of    │
│ the SDM rule                            │
│                 510                     │
└─────────────────────────────────────────┘
```

FIG. 5

HOT SPOT DETECTION AND REPORTING SYSTEM

CROSS-REFERENCE TO RELATED APPLICATIONS

This application claims the benefit of and priority to U.S. provisional application No. 63/292,243, filed Dec. 21, 2021, the contents of which are incorporated herein by reference in their entirety.

TECHNICAL FIELD

Aspects described herein generally relate to a hotspot detection and reporting system and, more particularly, to the use of previously-issued safety-based warnings to identify hotspots, determine safety driving model (SDM) rules, and adjust SDM parameters when predefined criteria are met, such as the vehicle's proximity to a hotspot location.

BACKGROUND

Driving safety continues to be a concern worldwide. Vehicles have continued to evolve with respect to their ability to perform autonomous and semi-autonomous functions, which include the use of advanced driving assistance (ADAS) systems. Such ADAS systems facilitate the presentation of warnings to vehicle drivers to enhance driver safety and mitigate unsafe driving conditions, but such ADAS systems often require manual vehicle control and navigation. As a result, human error is still to blame to the vast majority of collisions, injuries, and other unsafe conditions. Thus, current autonomous vehicle (AV) and ADAS systems still fall short in protecting passengers by inadequately accounting for such human errors.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 4 illustrates an example of aggregated data set used to identify hotspot locations, in accordance with one or more aspects of the present disclosure.

FIG. 5 illustrates an example process flow, in accordance with one or more aspects of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
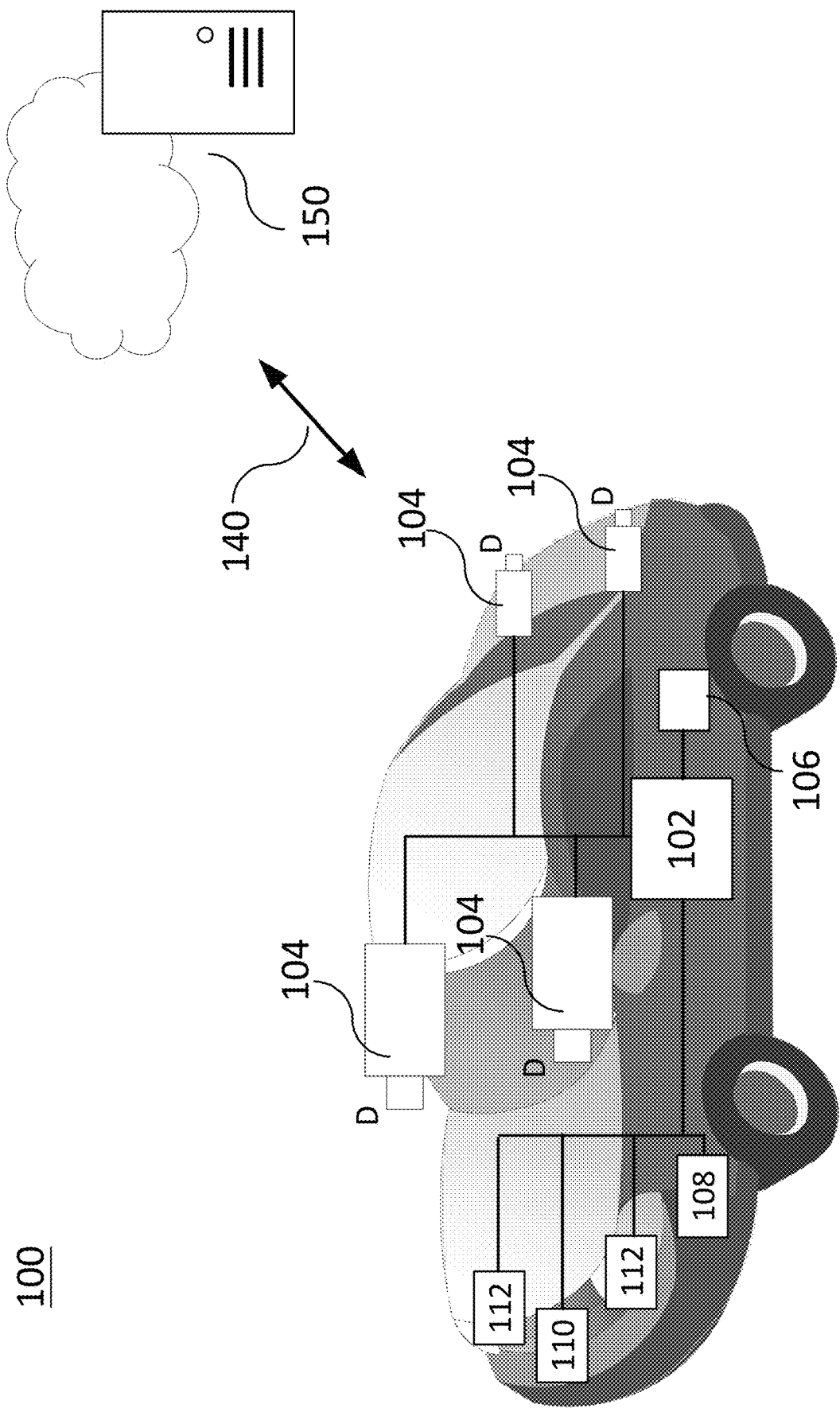
FIG. 1 illustrates an exemplary vehicle in accordance with one or more aspects of the present disclosure.

FIG. 1 illustrates a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driving assistance control system, including AV and/or an advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle 100's systems and/or part of an aftermarket system that is installed in the vehicle 100.

The one or more processors 102 may be integrated with or separate from an electronic control unit (ECU) of the vehicle 100 or an engine control unit of the vehicle 100, which may be considered herein as a specialized type of an electronic control unit. The safety system 200 may generate data to control or assist to control the ECU and/or other components of the vehicle 100 to directly or indirectly control the driving of the vehicle 100. However, the aspects described herein are not limited to implementations within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
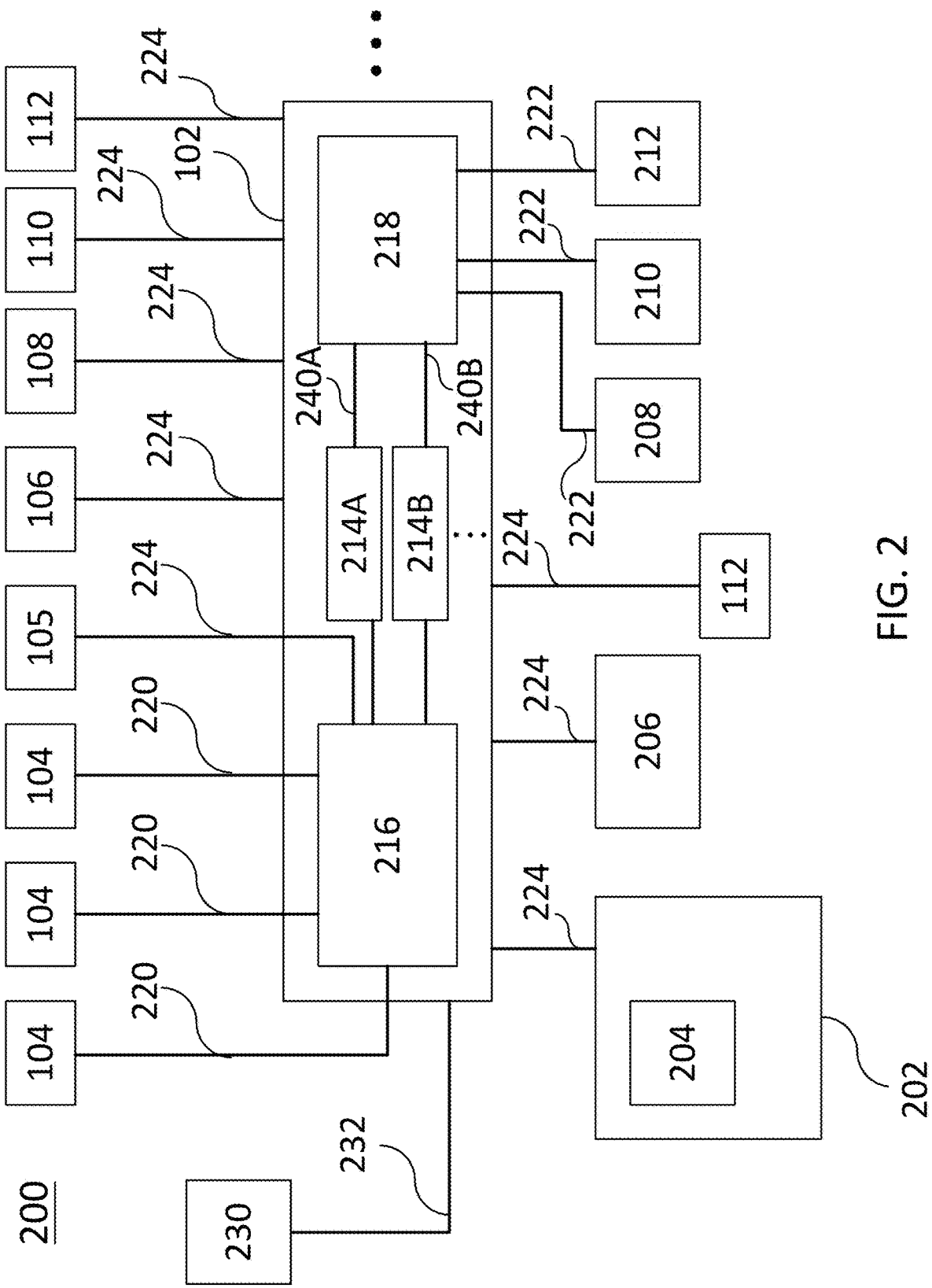
FIG. 2 illustrates various exemplary electronic components of a safety system of a vehicle in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more vehicle cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212. Additionally or alternatively, the one or more user interfaces 206 may be identified with other components in communication with the safety system 200, such as one or more components of an ADAS system, an AV system, etc., as further discussed herein.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short-Range mobile radio communication standard such as e.g. BLUETOOTH™, ZIGBEE™, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11 g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices 150 via one or more wireless links 140. This may include, for instance, communications with a remote server or other suitable computing system as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the remote computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors 102 and/or the safety system 200 may form the entirety of or portion of an advanced driver-assistance system (ADAS) or an autonomous vehicle (AV) system.

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors may thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any suitable wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example. Of course, the application processors 214A, 214B may perform other functions in addition to or as an alternative to control-based functions, such as the various processing functions discussed herein, providing warnings regarding possible collisions, etc.

The one or more processors 102 may additionally be implemented to communicate with any other suitable components of the vehicle 100 to determine a state of the vehicle while driving or at any other suitable time, which may comprise an analysis of data representative of a vehicle status. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.).

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective 214A, 214B, 216, 218 or accessed via another memory that is part of the safety system 200 or external to the safety system 200. This memory may include the one or more memories 202. Regardless of the particular type and location of memory accessed by the 214A, 214B, 216, 218, the memory may store software and/or executable instructions that, when executed by a relevant processor (e.g., by the one or more processors 102, one or more of the processors 214A, 214B, 216, 218, etc.), controls the operation of the safety system 200 and may perform other functions such as identifying the location of the vehicle 100 (e.g. via the one or more position sensors 106), determining the location of one or more hotspots, determining a SDM rule, adjusting SDM parameters in accordance with SDM rules, and/or when to cause the user interface to issue appropriate warnings, which may include the use of the interface 206 or any other suitable display device for this purpose, as further discussed herein.

A relevant memory accessed by the one or more processors 214A, 214B, 216, 218 (e.g. the one or more memories 202) may also store one or more databases and image processing software, as well as a trained system, such as a neural network, or a deep neural network, for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random-access memories, read only memories, flash memories, disk drives, optical storage, tape storage, removable storage, or any other suitable types of storage.

The components associated with the safety system 200 as shown in FIG. 2 are illustrated for ease of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions. Again, such a controller or system may be configured to execute the various to perform functions related to issuing warnings and/or controlling various aspects of the vehicle 100, as discussed in further detail herein, to present relevant warnings and/or to control of the state of the vehicle 100 in which the safety system 200 is implemented.

In some aspects, the safety system 200 may further include components such as a speed sensor 108 (e.g. a speedometer) for measuring a speed of the vehicle 100. The safety system 200 may also include one or more inertial measurement unit (IMU) sensors such as e.g. accelerometers, magnetometers, and/or gyroscopes (either single axis or multiaxis) for measuring accelerations of the vehicle 100 along one or more axes, and additionally or alternatively one or more gyro sensors, which may be implemented for instance to calculate the vehicle's ego-motion as discussed herein, alone or in combination with other suitable vehicle sensors. These IMU sensors may, for example, be part of the position sensors 105 as discussed herein. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (e.g., one or more links 224) may couple the speed sensor 108, the one or more radar sensors 110, and the one or more LIDAR sensors 112 to at least one of the one or more processors 102.

Autonomous Vehicle (AV) Map Data and Road Experience Management (REM)

Data referred to as REM map data (or alternatively as Roadbook Map data or AV map data), may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. It is noted that although referred to herein as "AV map data," the data may be implemented in any suitable vehicle platform, which may include vehicles having any suitable level of automation (e.g. levels 0-5), as noted above.

Regardless of where the AV map data is stored and/or accessed, the AV map data may include a geographic location of known landmarks that are readily identifiable in the navigated environment in which the vehicle 100 travels. The location of the landmarks may be generated from a historical accumulation from other vehicles driving on the same road that collect data regarding the appearance and/or location of landmarks (e.g. "crowd sourcing"). Thus, each landmark may be correlated to a set of predetermined geographic coordinates that has already been established. Therefore, in addition to the use of location-based sensors such as GNSS, the database of landmarks provided by the AV map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions.

Furthermore, and as noted above, the vehicle 100 may determine its own motion, which is referred to as "ego-motion." Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze the ego-motion to determine the position and orientation of the vehicle 100 with respect to the identified known landmarks. Because the landmarks are identified with predetermined geographic coordinates, the vehicle 100 may determine its location and position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the AV map data is generally constructed as part of a series of steps, which may involve any suitable number of vehicles that opt into the data collection process. As each vehicle collects data, the data is classified into tagged data points, which are then transmitted to the cloud or to another suitable external location. A suitable computing device (e.g. a cloud server) then analyzes the data points from individual drives on the same road, and aggregates and aligns these data points with one another. After alignment has been performed, the data points are used to define a precise outline of the road infrastructure. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the AV map data. This information is then compiled into a Roadbook Map, which constitutes a bank of driving paths, semantic road information such as features and objects, and aggregated driving behavior.

A map database 204, which may be stored as part of the one or more memories 202 or accessed via the computing system 150 via the link(s) 140, for instance, may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the AV map data, which includes data relating to the position, in a reference coordinate system, of various landmarks such as objects and other items of information, including roads, water features, geographic features, businesses, points of interest, restaurants, gas stations, etc.

The map database 204 may thus store, as part of the AV map data, not only the locations of such landmarks, but also descriptors relating to those landmarks, including, for example, names associated with any of the stored features, and may also store information relating to details of the items such as a precise position and orientation of items. In some cases, the AV map data may store a sparse data model including polynomial representations of certain road features (e.g., lane markings) or target trajectories for the vehicle 100. The AV map data may also include stored representations of various recognized landmarks that may be provided to determine or update a known position of the vehicle 100 with respect to a target trajectory. The landmark representations may include data fields such as landmark type, landmark location, etc., among other potential identifiers. The AV map data may also include non-semantic features including point clouds of certain objects or features in the environment, and feature point and descriptors.

The map database 204 may be augmented with data in addition to the Roadbook Map data, and/or the map database 204 and/or the Roadbook Map data may reside partially or entirely as part of the remote computing system 150. As discussed herein, the location of known landmarks and map database information, which may be stored in the map database 204 and/or the remote computing system 150, may form what is referred to herein as "AV map data," "REM map data," or "Roadbook Map data." The one or more processors 102 may process sensory information (such as images, radar signals, depth information from LIDAR or stereo processing of two or more images) of the environment of the vehicle 100 together with position information, such as GPS coordinates, the vehicle's ego-motion, etc., to determine a current location, position, and/or orientation of the vehicle 100 relative to the known landmarks by using information contained in the AV map. The determination of the vehicle's location may thus be refined in this manner. Certain aspects of this technology may additionally or alternatively be included in a localization technology such as a mapping and routing model.

The aspects described herein may further leverage the use of the AV map data to identify hotspot locations, as further discussed herein. Thus, the hotspot data may constitute part of the AV map data or a separately-generated and/or accessed hotspot map. The AV map data and/or the hotspot map data (which again may constitute a single entity of map data in some aspects) may be stored in any suitable location and may be downloaded and stored locally as part of the map database 204, which again may be stored as part of the one or more memories 202 or accessed via the computing system 150 via the link(s) 140, for instance. Moreover, the AV map data as discussed herein is described primarily with respect to the use of geographic locations of known landmarks and other types of information that may be identified with those landmarks. However, this is by way of example and not limitation, and the AV map may be identified with any suitable content that can be linked to an accurate geographic or other suitable location.

Safety Driving Model (SDM) and SDM Parameters

Furthermore, the safety system 200 may implement a safety driving model (also referred to as a "driving policy model" or simply as a "driving model"), e.g., which may be utilized and/or executed as part of the ADAS system and/or AV system as discussed herein. By way of example, the safety system 200 may include (e.g., as part of the driving model) a computer implementation of a formal model such as a safety driving model. A safety driving model (SDM) may include an implementation in digital computer hardware of a mathematical model formalizing an interpretation of applicable laws, standards, policies, etc. that are applicable to self-driving (e.g., ground) vehicles. In some embodiments, the SDM may comprise a standardized driving policy such as the Responsibility Sensitivity Safety (RSS) model. However, the embodiments are not limited to this particular example, and the SDM may be implemented using any suitable driving policy model that defines various safety parameters that the vehicle 100 should comply with to facilitate safe driving.

For instance, the SDM may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model (e.g. the vehicle 100) may be or include an implementation of a mathematical model for safety assurance that enables identification and performance of proper responses to dangerous situations such that self-perpetrated accidents can be avoided.

A safety driving model may implement logic to apply driving behavior rules such as the following five rules:
  Do not hit someone from behind.
  Do not cut-in recklessly.
  Right-of-way is given, not taken.
  Be careful of areas with limited visibility.
  If you can avoid an accident without causing another one, you must do it.

It is to be noted that these rules are not limiting and not exclusive, and can be amended in various aspects as desired. The rules thus represent a social driving "contract" that might be different depending upon the region, and may also develop over time. While these five rules are currently applicable in most countries, the rules may not be complete or the same in each region or country and may be amended.

As described above, the vehicle 100 may include the safety system 200 as also described with reference to FIG. 2. Thus, the safety system 200 may generate data to control or assist to control the ECU of the vehicle 100 and/or other components of the vehicle 100 to directly or indirectly control the driving operation of the vehicle 100, which may include driving the vehicle 100 or other suitable operations as further discussed herein. This control may optionally include adjusting one or more SDM parameters as further discussed herein, which may occur in response to the detection of any suitable type of feedback that is obtained via image processing, sensor measurements, etc. The feedback used for this purpose may be collectively referred to herein as "environmental data measurements" and include any suitable type of data that identifies a state associated with the external environment, the vehicle occupants, the vehicle 100, and/or the cabin environment of the vehicle 100, etc.

For instance, the environmental data measurements may include any suitable type of data representative of and/or analyzed to identify a state of a driver (e.g. drowsiness) or other passengers in the vehicle. The environmental data measurements may also include data indicative of monitored driver decisions while driving the vehicle 100, which may be particularly useful to anticipate driver mistakes and issue a warning or alert to correct or mitigate such mistakes. As another example, the environmental data measurements may identify a longitudinal and/or lateral distance between the vehicle 100 and other vehicles, the presence of objects in the road, the location of hazards, etc. The environmental data measurements may be obtained and/or be the result of an analysis of data acquired via any suitable components of the vehicle 100, such as the one or more image acquisition devices 104, the one or more sensors 105, the position sensors 106, the speed sensor 108, the one or more radar sensors 110, the one or more LIDAR sensors 112, etc. To provide an illustrative example, the environmental data may be used to generate an environmental model based upon any suitable combination of the environmental data measurements. The vehicle 100 may utilize the environmental model to perform various navigation-related operations within the framework of the driving policy model.

Thus, the environmental data measurements may be referenced by the safety system 200 in accordance with the SDM parameters to estimate or predict dangerous situations and, in response, perform an action such as a change in the navigational-related operation of the vehicle, issuing a warning, etc. In this way, the ADAS may leverage or reference the SDM parameters defined by the safety driving model when performing control-based operations or non-control-based operations of the vehicle 100 in accordance with environmental data measurements, depending upon the particular scenario. The control-based operations may thus cause the vehicle 100 to comply with the SDM parameters defined by the SDM model as discussed herein. For instance, control-based operations of the vehicle 100 may include steering the vehicle 100, changing an acceleration and/or velocity of the vehicle 100, etc. Examples of non-control-based operations include causing the one or more user interfaces 206 to issue relevant alerts or warnings, changing a vehicle setting, etc.

Navigation-related operations may be performed, for instance, by generating the environmental model and using the driving policy model in conjunction with the environmental model to determine an action to be carried out by the vehicle. The environmental model may be continuously updated based on sensor data, map data etc., such that at any given instant a current state of the environmental model represents an up-to-date representation of objects (e.g. sensed and/or mapped) and relationships between objects in the environment of the vehicle. That is, the driving policy model may be applied based upon the environmental model to determine one or more actions (e.g. navigation-related operations) to be carried out by the vehicle. By way of example, the SDM may be configured to accomplish long term navigational goals by determining and executing a plurality of actions based on an evolving environmental model (typically a respective set of states which are used to determine the actions). The SDM can be used in conjunction (as part of or as an added layer) with the driving policy model to assure a safety of an action to be carried out by the vehicle at any given instant. For example, the ADAS may leverage or reference the SDM parameters defined by the safety driving model to determine navigation-related operations of the vehicle 100 in accordance with the environmental data measurements depending upon the particular driving scenario. The navigation-related operations may thus cause the vehicle 100 to execute a specific action based upon the environmental model to comply with the SDM parameters defined by the SDM model as discussed herein. For instance, navigation-related operations may include steering the vehicle 100, changing an acceleration and/or velocity of the vehicle 100, executing predetermined trajectory maneuvers, etc. In other words, the environmental model may be generated using acquired sensor data, and the applicable driving policy model may then be applied together with the environmental model to determine a navigation-related operation or other action (e.g. issuing a warning) to be performed by the vehicle. Further by way of example, the SDM can be used as part of the driving policy model or as a separate model that is applied "on top" of the driving policy model to enhance the safety of actions selected by the driving policy model. In addition to improving safety, the driving policy model, together with the SDM, can configured to achieve high efficiency (while enhancing safety) for AV driving.

The aspects as described herein may additionally or alternatively utilize the detection of hotspots and/or other conditions related to the detection of hotspots such as the proximity of the vehicle 100 to hotspots, the time of day, etc. to adjust the SDM parameters and/or to cause the vehicle to perform specific control-based or non-control-based operations. Thus, the detection of hotspots and/or other conditions identified with the detection of hotspots may be considered part of the environmental data measurements as discussed above, which may be used to trigger various vehicle operations as discussed herein.

Examples of Safety Parameters

As discussed herein, the vehicle 100 may implement an ADAS system to utilize one or more safety driving models (SDMs), which define safety parameters in accordance with various rules, such as the five driving rules as noted above, for instance. Again, the defined safety parameters allow the vehicle 100 to enforce these driving rules by measuring the environment via various sensors, AV systems, image analysis, object detection and classification, etc., and then calculate the appropriate safety parameters (also referred to herein as SDM parameters) using this information.

For example, two SDM parameters that are used in accordance with the aspects as described herein include the longitudinal (e.g. following distance) and lateral distances between vehicles, represented as $d^{long}$ and $d^{lat}$, respectively. These longitudinal and lateral distances are a function of each vehicle's velocity (e.g. a rear (enforcing) vehicle ($v_{rear}$) and a front vehicle ($V_{front}$)), each vehicle's possible longitudinal maximum acceleration ($a_{max,accel}^{long}$) and lateral maximum acceleration ($a_{max,accel}^{lat}$), each vehicle's possible longitudinal minimum deceleration ($a_{min,brake}^{long}$) and possible lateral minimum deceleration ($a_{min,brake}^{lat}$), each vehicle's possible longitudinal maximum deceleration ($a_{max,brake}^{long}$) and lateral maximum deceleration ($a_{max,brake}^{lat}$), and response times of the vehicles ($\rho$). The minimum safe longitudinal distance $d_{min}^{long}$) and the minimum safe lateral distance ($d_{min}^{lat}$) are defined below in accordance with Equations 1 and 2 respectively.

$$d_{min}^{long} = \left[ v_{rear}\ \rho + \frac{1}{2}a_{max,accel}^{long}\ \rho^2 + \frac{(v_{rear} + \rho\ a_{max,accel}^{long})^2}{2a_{min,brake}^{long}} - \frac{v_{front}^2}{2a_{max,brake}^{long}} \right], \quad \text{Eqn. 1}$$

where the longitudinal minimum safe distance dmg applies to rear and front cars driving in the same direction; and $$d_{min}^{lat} = \mu + \left[ \frac{2\ v_1 + \rho\ a_{max,accel}^{lat}}{2}\rho + \frac{(v_1 + \rho\ a_{max,accel}^{lat})^2}{2\ a_{min,brake}^{lat}} - \left( \frac{2v_2 - \rho\ a_{max,accel}^{lat}}{2}\rho - \frac{(v_2 - \rho\ a_{max,accel}^{lat})^2}{2\ a_{min,brake}^{lat}} \right) \right], \quad \text{Eqn. 2}$$

where the lateral minimum safe distance $d_{min}^{lat}$ applies with notations associated with a $car_1$ to the left of a $car_2$, and where $\mu$ represents a safe lateral distance measurement, which may be calculated in accordance with any known manner The SDM parameters shown above are provided by way of example and not limitation, and may include any suitable type of parameters that define safe operation of the vehicle 100, and which may or may not be adjusted in various scenarios such as when a proximity of the vehicle 100 to a hotspot is detected. For instance, the SDM parameters may comprise a maximum vehicle speed, a minimum vehicle speed, a maximum steering angle, a maximum vehicle acceleration, etc. The calculation and/or modification of the appropriate SDM parameters may be based upon one or more SDM rules that comprise at least part of the SDM, which may be situational, i.e. a function of any suitable combination of conditions. For example, an SDM rule to be applied for a particular scenario may be a function of the environmental data measurements as discussed above, the location of the vehicle 100, and the location of the vehicle 100 with respect to a hotspot location. Thus, the ADAS system as discussed herein may function to determine an SDM rule and the associated SDM parameters to be used for that SDM rule (which may be adjusted from default or previously used SDM parameters) in response to various conditions being satisfied, which may include the proximity of the vehicle to an identified hotspot location, as well as other conditions as further discussed herein.

For instance, the SDM parameters may include maximum and/or minimum velocity, maximum and/or minimum acceleration, a maximum braking force to be applied, etc., for various scenarios, with each scenario being identified with a respective SDM rule. Thus, a corresponding SDM rule that utilizes these SDM parameters may indicate the manner in which braking is to be applied to prevent the vehicle 100 from exceeding a maximum velocity, the speed at which the vehicle 100 should execute turns and other maneuvers, etc. The SDM parameters may additionally or alternatively depend on the type of the vehicle 100, the loading of the vehicle 100, age or mechanical conditions of the vehicle 100, environmental conditions, choice of driving style (i.e., more assertive or more conservative), etc. Again, and in accordance with the aspects described herein, the SDM parameters may additionally or alternatively depend upon predefined criteria being met, such as the detection of hotspot locations, the proximity of the vehicle 100 to such hotspot locations, the vehicle approaching a hotspot location, as well as any other suitable criteria.

Hotspot Map Data

As noted above, the AV map data may be utilized by the safety system 200 to track the location of the vehicle 100 and/or the current road position with respect to identified landmarks, along splines marking road features (such as drivable paths, lane marks, etc.) and to determine a semantic meaning or relevancy of road features (such as traffic light relevancy or stopping location in a junction with or without a stop line). However, the aspects are not limited to the use of the AV map data for this purpose, and may include the vehicle 100 identifying its location in accordance with any suitable techniques and within any suitable coordinate reference frame, including known techniques such as via GNSS.

In any event, when the AV map data is utilized by the safety system 200, the location of the vehicle 100 may be determined on the road and relative to an AV map with high accuracy. As a result, other functions of the vehicle related to and/or utilizing the location of the vehicle on the road may be executed with increased accuracy and efficiency. The aspects as described herein may augment the AV map data with what is referred to herein as hotspot map data, or alternatively may separately implement the hotspot map data. Regardless of the manner in which the hotspot map data is generated, accessed, and/or stored, the hotspot map data may represent a map of geographic locations, which are referred to herein as hotspot locations, corresponding to locations (on a map) which a number of safety-based warnings that were previously issued by other vehicles meet or exceed a predefined criterion. For example, the hotspot locations may correspond to geographic locations at which a number of safety-based warnings were previously issued by other vehicles in excess of a predetermined threshold value. In another example, the hotspot locations may correspond to locations of objects or road features in a map where a number of safety-based warnings were previously issued by other vehicles in excess of a predetermined threshold value. The predetermined values used to establish hotspot locations may optionally depend upon various factors, such that hotspot locations may be determined in response to a greater or lesser number of previously-issued safety-based warnings based upon the severity of the safety-based warnings, the type of safety-based warnings, the type of vehicles issuing the safety-based warnings, etc.

The vehicle 100 may implement the safety system 200 (which again may function as part of an ADAS or AV system) to perform driver and/or vehicle monitoring functions, which are used to generate safety-related warnings to the driver or other occupants of the vehicle 100. These safety-related warnings may additionally or alternatively include "passive" warnings that may not be presented or otherwise known by the vehicle occupants, but may still present a hazard. Thus, the safety-related warnings as discussed herein may include any suitable type of generated (e.g. via any suitable components of the vehicle 100) warnings indicative of driver state, vehicle state, and/or environmental state that may represent a potential risk to the driver and/or passengers of the vehicle 100 or other vulnerable road users (VRUs) that share an environment with the vehicle 100.

For instance, the safety-based warnings that are previously-issued by the various vehicles, which are aggregated and used to determine hotspot locations, may represent any suitable type of warnings that are issued (e.g. generated) while a vehicle is being operated. Such safety-based warnings may comprise audio and/or video-based warnings that are generated in response to various detected conditions, which aim to mitigate unsafe conditions, eliminate (or at least reduce) possible collisions with other vehicles, objects, VRUs, etc. Additionally or alternatively, the safety-based warnings may comprise generated situational awareness messages, audio and/or video messages, etc. Still further, the safety-based warnings may be silent or otherwise transparent to the vehicle operator, and comprise navigational assistance and/or control executed via the vehicle to avoid or mitigate a dangerous situation such as an adjustment to a trajectory, emergency braking, etc. Some other examples of such safety-based warnings may include warnings issued when a vehicle is following too closely, other vehicles coming into the lane of the vehicle 100, warnings issued related to the proximity of the vehicle to VRUs, warnings issued with respect to the focus (e.g. eye gaze) of the driver deviating from the direction of travel of the vehicle 100, collision warnings or near misses of collisions, emergency braking warnings, events related to the detection of VRUs (e.g. pedestrians or cyclists) and/or near misses with such VRUs, events related to skidding, icy pavement, etc.

In other words, the safety-based warnings that are aggregated to determine the hotspot locations as discussed herein are generally indicative of an occurrence of events over time and issued from several different reporting vehicles, and indicate a higher likelihood of the occurrence of unsafe driver behavior or other unsafe conditions. Regardless of the specific types of warnings that are issued, the aspects described herein function to generate the hotspot map data by collecting and aggregating such safety-related warnings for any suitable number and/or type of vehicles that traverse the same locations over time. For example, the vehicle 100, as well as any other suitable number of vehicles, may store and/or transmit (e.g. via the one or more transceivers 208, 210, 212) a log of previously-issued safety-based warnings to an external computing device (e.g. computing system 150). Thus, the hotspot map data may include a correlation of geographic locations that represent an aggregation of warnings of various types issued at various times across any suitable number of geographic locations within a particular region. In this way, for any suitable type of safety-based warnings and predefined constraints defined for those safety-based warnings, the hotspot map data represents zones or hotspots. Such zones define locations having an increased number of safety-based warnings that have been previously issued by any suitable number of vehicles. Thus, the aspects described herein are directed to the vehicle 100 identifying the hotspots or zones as indicated in the hotspot map data, and using this information to present warnings or to perform other types of actions depending upon a particular scenario. Hotspot map data is further discussed below with respect to FIGS. 3 and 4.

Figure 3:
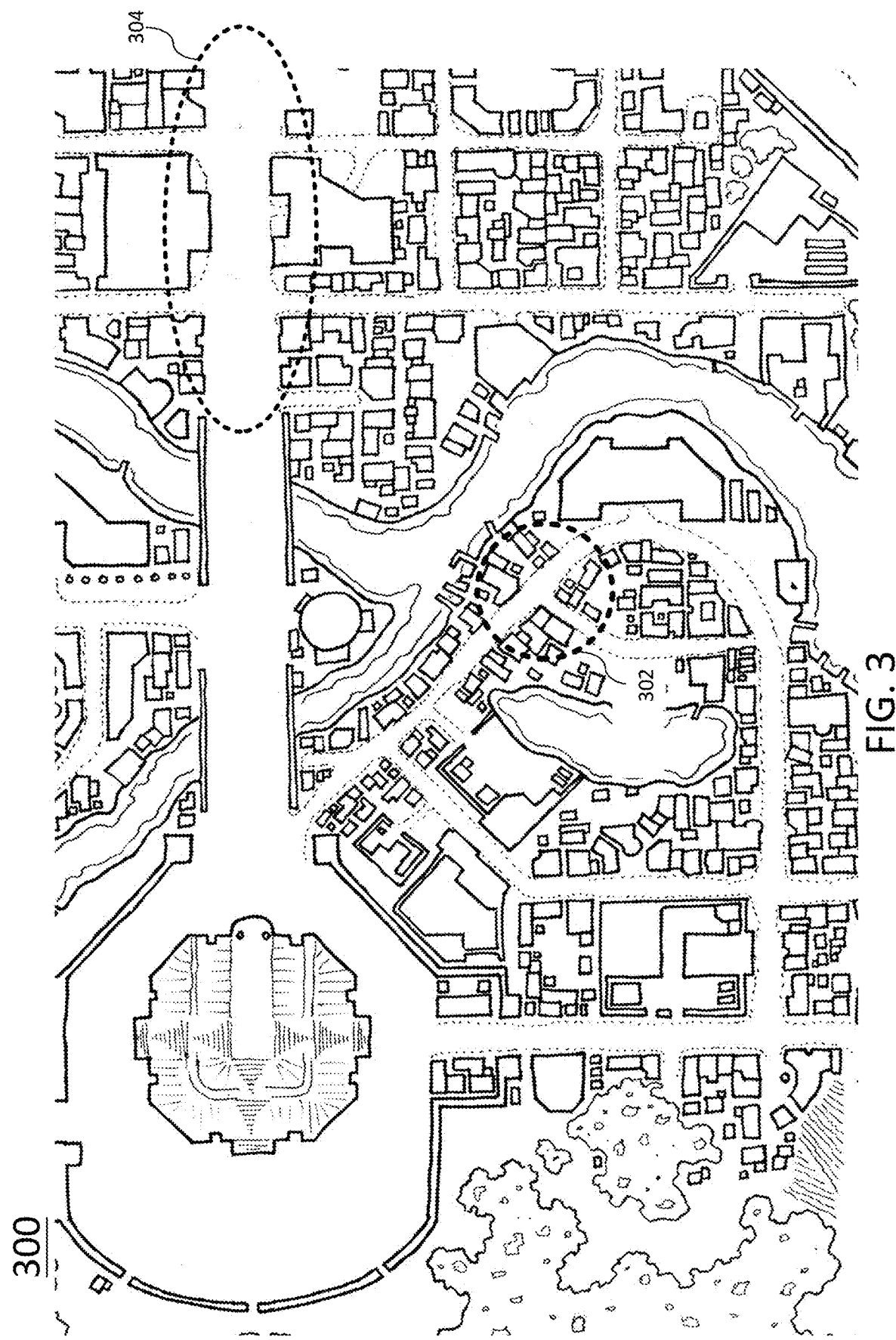
FIG. 3 illustrates an example graphical representation of hotspot map data, in accordance with one or more aspects of the present disclosure.

FIG. 3 illustrates an example graphical representation of hotspot map data, in accordance with one or more aspects of the present disclosure. The hotspot map 300 as shown in FIG. 3 includes two hotspots 302, 304, although it is understood that the hotspot map may include any suitable number of hotspots based upon the particular region and the reports received. The hotspots 302, 304 respectively identify a region of any suitable size and/or shape, may be defined in accordance with a set of geographic coordinates such as a geofence, and which are shown in FIG. 3 as being overlaid onto a real-world map for ease of explanation. The hotspot map data may, however, be stored in any suitable format and in any suitable location. For instance, the hotspot map data identified with the hotspot map 300 may be stored in the remote computing system 150, and periodically downloaded, wholly or part of the map (e.g., only tiles of the map which are in the vicinity of the vehicle's current location are communicated to the host vehicle) to the local storage of the vehicle 100 to update the map database 204.

In any event, the hotspot map data identified with the hotspot map 300 may include any other suitable type of data in addition to the sets of coordinates that identify the locations of each hotspot. Thus, the vehicle 100 may access the hotspot map data to identify the hotspot locations. Additionally, the vehicle 100 (e.g. via the safety system 200) may selectively determine which hotspot locations are to be used for determining a particular SDM rule, which hotspot locations will be used to generate trigger signals when the vehicle 100 is proximate to the hotspot locations, as well as which hotspot locations will be used to adjust the SDM parameters in accordance with SDM rule in response to the generated trigger signals. Additional details of these aspects are further disused below.

Thus, in some aspects the vehicle 100 may continuously or periodically compare the location of the vehicle 100 to the hotspot locations retrieved from the hotspot map data. Then when one or more conditions are met (e.g. proximity of the vehicle 100 to a hotspot), the vehicle 100 may take the appropriate action. As some illustrative examples, the vehicle 100 may adjust the SDM parameters of a determined SDM rule, execute a control-based or on-control based action, etc.

However, in other aspects the vehicle 100 may "filter" the hotspots according to other conditions and selectively take action based upon whether these additional conditions are met. For instance, each hotspot location may be identified with a set of aggregated data reported from other vehicles that have previously issued safety-based warnings. But because the aggregated data may correspond to a wide range of different types of vehicles, be collected during different times of the day or different times of the year, etc., the vehicle 100 may utilize the aggregated data to determine whether each hotspot location is applicable for that particular vehicle under the current conditions.

For example, FIG. 4 illustrates an example of aggregated data set used to identify a hotspot location, in accordance with one or more aspects of the present disclosure. As shown in FIG. 4, the aggregated data set corresponds to data reported and/or received via other vehicles over time within a geographic area that corresponds to the geographic coordinates identified with the hotspot location. Thus, the aggregated data set 400 may correspond to data received from a number of vehicles over any suitable period of time such as the previous 5 years, 1 year, 6 months, 6 weeks, 4 days, 2 hours, etc. Again, the aggregated data set 400 may correspond to data collected from vehicles within a previous time frame in response to those vehicles issuing respective safety-based warnings.

That is, the hotspots 302, 304 may be identified by applying one or more rules to data that has been collected for vehicles reporting information with respect to the issuance of safety-based warnings over time, and which has been aggregated over a large area such as the larger map region as shown in FIG. 3. The hotspots 302, 304 may thus be determined by identifying regions that meet predefined constraints, as noted above. These predefined constraints may include, for instance, an overall number of safety-based warnings being issued within a predetermined threshold time period exceeding a predefined threshold or, alternatively, a number of safety-based warnings of a specific type, for a specific type of vehicle, etc., that were previously issued over a predetermined threshold time period and exceed a predefined threshold. As another example, the predefined constraints may include an indication of road closures, current collisions or other events being reported at a particular hotspot location, etc.

Thus, in the example shown in FIG. 4, the aggregated data set 400 may include any suitable type of data, taking into consideration compliance with privacy rules and other local laws and regulations. Thus, in various embodiments, the aggregated data set 400 may optionally include a unique vehicle identifier reported by each vehicle, the type of vehicle reporting the safety-based warning, as well as any other suitable type of information accompanying the issuance of the safety-based warning such as a timestamp, vehicle data (e.g. the heading, orientation, velocity, etc. of the vehicle), environmental data (e.g. weather conditions, temperature, wind, etc.), geolocation coordinates corresponding to when each safety-based warning was issued, a description of the warning, a location on a map (e.g. a position on a trajectory and location relative to a nearby landmark(s)), etc. The data set 400 as shown in FIG. 4 is provided by way of example and not limitation, and may include alternate or additional information of any suitable type relevant to the identification of hotspot locations as discussed herein. Thus, aspects include the vehicle 100 using the information obtained from the data set 400 to determine whether the hotspot is to be used to execute the various actions as noted herein.

In an aspect, the data set 400 may contain several hundred or several thousand data entries aggregated from data reported via any suitable number of vehicles, and correspond to one of the hotspots 302, 304. Thus, the predefined criterion in this context may be the total number of safety-based warnings reported over a predetermined previous threshold time period, regardless of the type of safety-based warnings that have been issued, and regardless of any other information included in the data set 400. However, in other aspects, the predefined criterion may be more selective such that the hotspots 302, 304 are identified based upon the relevance of the safety-based warnings to the vehicle 100. The decision with respect to how the hotspots 302, 304 are identified in this manner may be performed in any suitable manner.

For instance, the remote computing device 150 may generate hotspot map data using the broadest predefined criterion (e.g. the number of safety-based warnings reported over a predetermined previous threshold time period regardless of the type of safety-based warnings that have been issued). Thus, the hotspot map data may represent a "superset" of hotspots applicable to a number of different vehicle types, environmental conditions, driving scenarios, vehicle states, driver states, etc. In accordance with such aspects, a vehicle (e.g. the vehicle 100) may apply alternate or additional predefined criteria to identify the hotspots that are relevant to the vehicle 100. As further discussed below, these criteria may be any suitable combination of conditions used to determine the relevance of the hotspot to the vehicle 100. Thus, the hotspot map data may, in accordance with such aspects, represent an initial set of hotspots, which may be filtered based upon their relevance and used to execute various actions in response to the vehicle 100's proximity to such hotspots.

In other aspects, the remote computing device 150 may generate the "superset" of hotspots as noted above, and apply further criteria to provide different hotspot map data to different vehicles. For example, the remote computing device 150 may identify hotspots to different vehicles based upon the vehicle type requesting the hotspot map data. To provide an illustrative example, the number of safety-based warnings issued by trucks within a previous time period may exceed a predetermined threshold number for the hotspot 302, while the number of safety-based warnings issued by passenger vehicles within the same previous time period may not exceed the predetermined threshold number. This scenario may be reversed for the hotspot 304, i.e. the number of safety-based warnings issued by passenger vehicles within a previous time period may exceed a predetermined threshold number for the hotspot 304, while the number of safety-based warnings issued by trucks within the same previous time period may not exceed the predetermined threshold number. Continuing this example, the remote computing device 150 may identify only the hotspot 302 for trucks and only the hotspot 304 for passenger vehicles. In this way, the hotspot map data downloaded by the vehicle 100 may contain a set of all hotspot locations over a particular region, with the vehicle 100 further identifying the relevant hotspot. Alternatively, the remote device 150 may make this determination such that the hotspot map data, once downloaded, is tailored to the relevance of each particular vehicle.

Actions Executed Using the Hotspot Map Data

Again, the various hotspot locations may be identified based upon any suitable number and/or type of predefined criteria. In any event, once the hotspot locations are identified, the vehicle 100 may perform various actions based upon its proximity to the hotspot locations, as well as in response to additional or alternate conditions being met as discussed herein. These actions may be the result of one or more trigger signals that are generated via the safety system 200. For instance, one or more trigger signals may be generated via the one or more processors 102, which may be the result of the one or more processors 102 executing instructions stored in a suitable memory (e.g. the one or more memories 202), a memory integrated within the one or more processors 102, etc. The one or more trigger signals may constitute any suitable type of signals, may be generated and/or transmitted in accordance with any suitable type of communication protocol, and may conform with any suitable type of communication standard (such as a controller area network (CAN) bus standard). Although referred to herein in the plural form, it is noted that the trigger signals may constitute any suitable number of such signals based upon the particular action that is executed, the configuration of the recipient component(s) of the trigger signals, and/or the particular application.

In any event, such trigger signals may be received by any suitable number and/or type of components identified with the vehicle 100, such as an AV and/or ADAS system as discussed herein, other components of the safety system 200 such as the user interfaces 206, as well as other components that are not shown in the Figures but may be used by the vehicle to perform various actions. As further discussed herein, the trigger signals may result in various actions to be executed by the vehicle 100, which are discussed in further detail immediately below.

In accordance with an aspect of the disclosure, the one or more processors 102 may determine a SDM rule identified with the safety-based warnings associated with a hotspot location. For example, and turning back to FIG. 4, one of the hotspot locations 302, 304 may be identified with the data set 400, and the hotspot may be identified with respect to a high number of safety-based warnings being previously issued with respect to vehicles following too closely, a VRU warning being issued, slippery conditions that resulted in the vehicle speed being reduced, wheel slippage, etc. Thus, upon one or more predetermined conditions being satisfied (e.g. the proximity of the vehicle 100 to the hotspot location 302, 304), the one or more processors 102 may determine a SDM rule that is based upon one or more of these safety-based warnings.

As an illustrative example, the processing circuitry as discussed herein may be implemented as part of the vehicle 100's ADAS system and/or AV system, or may communicate with such components. Thus, the processing circuitry of the vehicle 100 may instruct or otherwise cause (via the use of the trigger signals) the ADAS or AV system to automatically adjust one or more SDM parameters based upon the location of the vehicle with respect to the one or more identified hotspot locations. This may include, for instance, the ADAS system or AV system automatically adjusting SDM parameters related to a following distance and/or a lateral distance between vehicles to add an additional "buffer" to compensate for the unsafe nature of the hotspot location. As further examples, this may include increasing the minimum safe longitudinal safe following distance and/or the minimum lateral distance as discussed above, or any other suitable type and/or number of SDM parameters based upon the location of the detected hotspot and/or the previous vehicle warnings identified with the detected hotspot. The vehicle 100 may then execute a control-based operation such as slowing down, changing lanes, etc., while ensuring that the vehicle 100 complies with the updated SDM parameters.

To provide an illustrative example, the one or more processors 102 may determine an SDM rule that is identified with the safety-based warnings with respect to vehicles following too closely. This may be performed by determining the SDM parameters that are affected by and/or involved in the various safety-based warnings that were previously issued, which may comprise part of the data set 400 (not shown), or computed in accordance with any suitable logic, predetermined rules, etc. In any event, and continuing the present illustrative example, the determined SDM rule may be the longitudinal minimum safe distance dl that is established in accordance with Equation 1 above. Thus, when the vehicle 100 is within a threshold predetermined distance of one of the hotspot locations 302, 304 (and optionally also moving towards the hotspot location), the one or more processors 102 may generate trigger signals based upon this SDM rule, which may include instructions or other data that identifies how the SDM parameters are to be changed. In response to receiving the trigger signals, the vehicle ADAS system, AV system, or other suitable computing system may then adjust one or more of the SDM parameters in accordance with the determined SDM rule. This may include, for example, increasing the longitudinal minimum safe distance and/or modifying one or more other SDM parameters upon which the longitudinal minimum safe distance is computed, as shown in Eqn. 1 above. In this way, the vehicle 100 may anticipate a safety-based warning being issued when approaching a hotpot location, and proactively adjust the SDM parameters based upon the previously-issued safety-based warnings to reduce the likelihood of a safety-based warning being issued for the vehicle 100.

As another illustrative example, the SDM parameters identified with a maximum velocity may be reduced based upon previously-issued safety-based warnings with respect to vehicle proximity to VRUs. This may proactively mitigate the application of braking by reducing the vehicle's speed while traversing the hotspot location. As yet another illustrate example, the SDM parameters identified with the maximum acceleration and/or maximum velocity may be reduced based upon previously-issued safety-based warnings with respect to the detection of slippery road surface conditions (e.g., wheel slippage warnings). Doing so may proactively allow the vehicle 100 to adapt to such conditions while approaching the hotspot location.

In some aspects, the vehicle 100 may adjust the SDM parameters based upon conditions in addition to or instead of the previously-issued safety-based warnings, or may use such conditions to further modify how the SDM parameters are adjusted. For example, the vehicle 100 may adjust the SDM parameters based upon a vehicle type, environmental conditions such as weather conditions, the time of day or time of year, etc. For example, the vehicle 100 may adjust the SDM parameters more conservatively (e.g. by further increasing the longitudinal minimum safe distance) for a truck or other heavier vehicle compared to passenger vehicle to compensate for the increased time required to stop. As another example, the vehicle 100 may adjust the SDM parameters more conservatively to account for icy conditions or other adverse weather the vehicle 100 may currently be experiencing.

To provide additional examples, the generated trigger signals may enable the vehicle 100 to perform other actions in addition to or instead of the SDM parameters being adjusted. For instance, the trigger signals may cause the one or more user interfaces 206 to perform non-control-based vehicle operations based upon the location of the vehicle 100 with respect to the one or more identified hotspot locations. Such non-control-based operations may include, for instance, issuing a warning that is presented in response to various conditions, such as the vehicle 100 being within a predetermined threshold distance from a hotspot location. Additional non-control-based operations may include adjusting the vehicle user interface settings to provide the user with additional information regarding the environment, enabling traction control features within the vehicle 100, etc.

In such a case, the one or more user interfaces 206 may present the safety-based warning to indicate the proximity of the vehicle to the nearby hotspot location. As an illustrative example, such a warning may comprise a text display such as "Warning: the vehicle is nearby the intersection of Fourth Ave. and Main St., which is classified as a high risk intersection," or "Warning: the nearby intersection of Fourth Ave. and Main St. is identified with a high incidence of pedestrian traffic." As another example, the warning may indicate specific information with respect to the safety-based warnings previously issued by the other vehicles corresponding to that hotspot location. An illustrative example of such a warning may comprise displayed text such as "Warning: the nearby intersection of Fourth Ave. and Main St. is identified with a high incidence of driver distraction as reported by other vehicles—please pay special attention to the road while travelling through this area."

To provide further illustrative examples, the one or more processors 102 may calculate a path and/or route that avoids the identified hotspot location(s) in response to the vehicle 100 approaching a hotspot location and/or being within a predetermined threshold distance of a hotspot location. In this context, it is noted that a route may comprise the set of roads and road segments from one location to another, whereas a path may comprise a set of points or a trajectory that the vehicle 100 takes between two points. Thus, when a vehicle changes a lane (e.g. on a route from point A to B), the vehicle 100 changes its path, and when the vehicle 100 changes the point B to a different point C for instance, then the vehicle 100 changes its route. The embodiments as discussed herein include any suitable type of navigational adjustments of the vehicle 100 to avoid identified hotspot locations, which may include calculated routes and/or paths. Such a navigational adjustment may be requested by a user, or comprise an alternate route and/or path if the vehicle 100 is already travelling along a route and/or path that would traverse the hotspot location. In either case, the user interface of the vehicle 100 may present the route and/or path, and/or the appropriate notification and/or warning indicating that the navigational adjustment avoids a hotspot, and optionally present the information as noted above with respect to the safety concerns related to the avoided hotspot location(s). Additionally or alternatively, the one or more processors 102 may generate the trigger signals in such a case, which may cause an AV system of the vehicle 100 to control the vehicle to follow the (updated) calculated route and/or path. In this way, the vehicle 100's response to the hotspot locations may vary depending upon the vehicle's capabilities and/or user preferences.

In further aspects, the SDM parameters may not be changed, although the trigger signals may cause the vehicle 100 to perform other actions. Such actions may constitute control-based operations executed by one of more vehicle components. For example, in the event that the vehicle 100 navigates through the identified hotspot location(s), the vehicle 100 may take mitigating action to help reduce the type of known risk for each hotspot location that is identified via the hotspot map data.

As another example, the trigger signals may result in the ADAS system (or other suitable vehicle components) not necessarily updating the SDM parameters, but instead using current (i.e. unadjusted) SDM parameters to perform various actions. Thus, the trigger signals as discussed herein may be generated when the vehicle 100 approaches a hotspot location (e.g. is within a predetermined threshold distance from the hotspot location and is moving towards the hotspot location). The trigger signals may, in turn, result in the vehicle 100 performing various actions that may include optional SDM parameter adjustments and/or the execution of other actions, as further discussed herein.

Moreover, aspects include the trigger signals being generated in response to the detection of other conditions in addition to or instead of the proximity of the vehicle 100 to hotspot locations. For instance, the trigger signals may be generated to cause the vehicle 100 to execute an action further based upon one or more conditions and/or scenarios. These conditions may be any suitable number and/or type of conditions such as a current environmental state, vehicular state, and/or vehicle occupant state as further discussed herein. In some aspects, these conditions and/or scenarios may match those of the safety-based warnings issued in connection with the identified hotspot locations, while in other aspects the conditions and/or scenarios may be independent of those associated with the safety-based warnings issued in connection with the identified hotspot locations.

In various aspects, an environmental state may include a current date, time of day, current weather conditions, etc. Again, in some aspects, these conditions may result in the generation of trigger signals and accompanying vehicle actions independently or with respect to matching conditions associated with when the safety-based warnings were previously issued by other vehicles at the locations associated with the one or more hotspot locations. For example, the timestamp data of previously-issued safety warnings used to generate the hotspot map data may be leveraged to identify specific times of the day during which safety warnings or other vehicle actions may be particularly relevant. Thus, the hotspot map data may indicate trends or other instances of hazards that are based upon the time of day, the time of year, etc.

To provide another illustrative example, trigger signals may be generated to cause a warning to be issued when the vehicle 100 is moving eastward towards a hotspot location that is identified with an increase of previously-issued warnings in the morning hours. This may be the result of the sun partially blocking the field of view of the driver, thereby causing a distraction and causing a distracted driver safety-based warning to be issued. However, the vehicle 100 may approach the same hotspot location outside of the morning hours, which may not result in the generation of trigger signals and an accompanying action.

To provide a further illustrative example, trigger signals may be generated to cause a warning to be issued about potential ice and slick conditions when the vehicle 100 is moving towards a hotspot location, which may be a bridge. The hotspot location may be identified with an increase of previously-issued warnings during the winter months but not during other times of the year. Thus, a warning may be issued when the vehicle 100 is approaching the hotspot location in the winter months or when the current temperature is less than a predetermined value, while the warning is not generated otherwise.

In various aspects, the vehicular state data may include a representation of any suitable physical state of the vehicle 100, such as the current heading (i.e. direction of travel), velocity, orientation, etc. Thus, and as noted above, the trigger signals may be generated in a more selective manner when the vehicle 100 is within a predetermined threshold distance of a hotspot location by further conditioning the trigger signal generation based upon the direction of travel of the vehicle 100. Thus, in such a scenario, the vehicle 100 may require both conditions to be satisfied (i.e. proximity to and approaching a hotspot location) to generate the trigger signals that result in the accompanying action. In this way, the vehicle 100 only executes actions when it is approaching the hotspot location and has an increased likelihood of traversing the hotspot location.

In various aspects, the vehicle occupant state data may include any suitable data representing a physical state of an occupant (e.g. the driver) of the vehicle 100. This may include any suitable type of information that may be obtained via occupant monitoring systems used by the vehicle 100 and/or data received from components in communication with the vehicle 100 such a biosensors for example. For example, the vehicle occupant state may indicate biological and physiological characteristics such as heart rate. To provide another example, the vehicle occupant state may include actions of the vehicle occupant such as a driver's direction of gaze or other information that may be obtained via a suitable in-vehicle monitoring system, such as a driver monitoring system (DMS) for example. It would be appreciated that the term "driver" as used herein relates to a human user of the vehicle. Such a user may be a passenger or a driver or a person/occupant in the vehicle while the vehicle is operated by an onboard self-driving system. For ease of explanation, the above terms may be used herein interchangeably unless otherwise apparent from the context.

To provide an illustrative example using the occupant state information, the trigger signals may be generated to cause the ADAS and/or AV system of the vehicle 100 to adjust the one or more SDM parameters based upon a driver's gaze. Such adjustments may be in addition to or instead of the SDM parameter adjustments discussed above, which may be triggered based upon the hotspot locations. For instance, when the gaze of a driver of the vehicle 100 is found to deviate from a predetermined direction for a period of time that exceeds a threshold time period, trigger signals may be generated to cause the SDM parameters to be adjusted to account for the increase in response time that is anticipated due to driver inattentiveness. The direction of the gaze may be measured relative to any suitable reference, such as the forward axis of the vehicle 100, the field of view (FOV) direction of a camera onboard the vehicle 100, the direction of the path ahead of the vehicle, etc. As was the case for the other illustrative examples noted herein, this may include increasing the longitudinal minimum safe distance, reducing the maximum velocity, and/or modifying one or more other SDM parameters upon which the longitudinal minimum safe distance is computed.

Furthermore, it is noted that in accordance with the aspects described herein, the various conditions used to generate the trigger signals may be static or dynamic in nature. For instance, the predetermined threshold distance between the vehicle 100 and a hotspot location may be fixed or, alternatively, be adjusted based upon various conditions being met. As one illustrative example using the aforementioned vehicle occupant state information, the gaze of the driver of the vehicle 100 may deviate from a predetermined direction for a period of time that exceeds a threshold time period. In such a case, the threshold predetermined distance may be increased to allow for the adjustment to the SDM parameters to occur sooner, compensating for potential driver inattentiveness.

To provide additional examples, the adjustment of the predetermined threshold distance may be performed in this manner based upon other conditions such as the vehicular and/or environmental state information. For instance, the predetermined threshold distance may be increased during adverse weather conditions, when the vehicle is driving in excess of a predetermined velocity, when a number of occupants in the vehicle exceeds a threshold number, when music volume exceeds a predetermined threshold volume level, when a driver is on a phone call, etc.

An Example Process Flow

FIG. 5. illustrates an example process flow, in accordance with one or more aspects of the present disclosure. The functionality associated with the blocks as discussed herein with reference to FIG. 5 may be executed, for instance, via processing circuitry identified with the vehicle 100 and/or the safety system 200. This may include, for example, the one or more processors 102, one or more of the processors 214A, 214B, 216, 218, etc., executing instructions stored in a suitable memory (e.g. the one or more memories 202). Again, the processing circuitry may implement the aspects as described herein as part of an ADAS and/or AV system of the vehicle 100, or may communicate with such systems (e.g. via the transmission of trigger signals) to implement the aspects as described herein.

The process flow 500 may begin by the vehicle 100 determining (block 502) a location of the vehicle 100. The location can be provided as 3D coordinates on a map. The location can be a location of the vehicle 100 along a trajectory of an AV map, such as a REM map, or in another example, the location can be a geographic location on a geographical map. This may be performed, for instance, via the position sensors 106 and/or using the AV map data, as noted herein. Thus, the location of the vehicle 100 may be determined using GNSS and/or the AV map data.

The process flow 500 may include the vehicle 100 identifying (block 504) one or more hotspot locations. This may be performed, for instance, using the hotspot map data that may be retrieved from an external computing device (e.g. computing system 150) and/or locally stored in a map database or other suitable storage location identified with the vehicle 100 (e.g. the map database 204), as noted herein. Again, the hotspot locations may be identified based upon safety-based warnings previously issued by other vehicles that meet a predefined criteria. For example, the hotspot locations may be defined as zones of a predetermined size, shape, radius, etc., that cover a region correlated to an increased number of previously-issued warnings for those regions. The hotspot locations may also correspond to safety-based warnings of a specific predetermined type, for a specific vehicle type, for a certain time of day, season, weather conditions, etc.

The process flow 500 may include the vehicle 100 determining (block 506) a safety driving model (SDM) rule identified with the safety-based warnings. This may include, for example, an SDM rule establishing a longitudinal minimum safe distance dl in accordance with Equation 1 above. Additionally or alternatively, the SDM rule may define any other suitable combination of SDM parameters based upon the nature of the safety-based warnings issued at the hotspot locations and/or the SDM parameters involved in or affected by the safety-based warnings being issued.

The process flow 500 may include the vehicle 100 generating (block 508) one or more trigger signals based upon the SDM rule and the location of the vehicle with respect to the hotspot location. This may include, for example, the one or more processors 102 generating trigger signals in response to the vehicle 100 being within a threshold predetermined distance of one of the hotspot locations 302, 304, approaching one of the hotspot locations 302, 304, etc., as noted herein. Again, the trigger signals may include instructions or other data that identifies how the SDM parameters are to be changed.

The process flow 500 may include the vehicle adjusting (block 510) one or more SDM parameters associated with the SDM rule. This may include, for example, one or more vehicle systems (e.g. an ADAS or AV system of the vehicle 100) adjusting the SDM parameters in response to receiving the trigger signals and in accordance with the determined SDM rule. This may include, for example, increasing the longitudinal minimum safe distance and/or modifying one or more other SDM parameters upon which the longitudinal minimum safe distance is computed, as shown in Eqn. 1 above.

EXAMPLES

An example (e.g. example 1) relates to a vehicle. The vehicle comprises a memory configured to store instructions; and processing circuitry that is part of an advanced driver-assistance system (ADAS) of the vehicle, the processing circuitry being configured to execute the instructions stored in the memory to: determine a location of the vehicle; identify a hotspot location that is associated with a location at which safety-based warnings that were previously issued by other vehicles meet a predefined criterion; determine a safety driving model (SDM) rule associated with the safety-based warnings; and generate one or more trigger signals based upon the SDM rule and the location of the vehicle with respect to the identified hotspot location, wherein the one or more trigger signals cause the ADAS to adjust one or more SDM parameters of the SDM rule.

Another example (e.g. example 2) relates to a previously-described example (e.g. example 1), wherein the SDM parameters comprise a follow distance.

Another example (e.g. example 3) relates to a previously-described example (e.g. one or more of examples 1-2), wherein the SDM parameters comprise a maximum vehicle speed.

Another example (e.g. example 4) relates to a previously-described example (e.g. one or more of examples 1-3), wherein the processing circuitry is further configured to calculate a navigational adjustment that avoids the hotspot location, and wherein the one or more trigger signals further cause an autonomous vehicle (AV) system of the vehicle to control the vehicle to follow the calculated navigational adjustment.

Another example (e.g. example 5) relates to a previously-described example (e.g. one or more of examples 1-4), wherein the processing circuitry is configured to generate the one of more trigger signals further based upon an environmental state or a vehicular state.

Another example (e.g. example 6) relates to a previously-described example (e.g. one or more of examples 1-5), wherein the environmental state comprises one of a time of day or a current weather condition, and wherein the vehicular state comprises a direction of vehicle travel.

Another example (e.g. example 7) relates to a previously-described example (e.g. one or more of examples 1-6), wherein the processing circuitry is configured to generate the one of more trigger signals to cause the ADAS to adjust the one or more SDM parameters based upon a gaze of a driver of the vehicle deviating from a predetermined direction for a period of time that exceeds a threshold time period.

Another example (e.g. example 8) relates to a previously-described example (e.g. one or more of examples 1-7), wherein the processing circuitry is configured to: generate the one or more trigger signals to cause the ADAS to adjust the one or more SDM parameters in response to the location of the vehicle being within a threshold predetermined distance from the hotspot location.

Another example (e.g. example 9) relates to a previously-described example (e.g. one or more of examples 1-8), wherein when a gaze of a driver of the vehicle deviates from a predetermined direction for a period of time that exceeds a threshold time period, to increase the threshold predetermined distance.

Another example (e.g. example 10) relates to a previously-described example (e.g. one or more of examples 1-9), wherein the processing circuitry is configured to generate the one of more trigger signals to cause the ADAS to adjust the one or more SDM parameters further based upon a vehicle type.

An example (e.g. example 11) is directed to a non-transitory computer-readable medium. The non-transitory computer-readable medium has instructions stored thereon that, when executed by processing circuitry of a vehicle, cause the vehicle to: determine a location of the vehicle; identify a hotspot location that is associated with a location at which a number of safety-based warnings that were previously issued by other vehicles exceed a predetermined threshold number; determine a safety driving model (SDM) rule associated with the safety-based warnings; and generate one or more trigger signals based upon the SDM rule and the location of the vehicle with respect to the identified hotspot location, wherein the one or more trigger signals cause an advanced driver-assistance system (ADAS) of the vehicle to adjust one or more SDM parameters of the SDM rule.

Another example (e.g. example 12) relates to a previously-described example (e.g. example 11, wherein the SDM parameters comprise a follow distance.

Another example (e.g. example 13) relates to a previously-described example (e.g. one or more of examples 11-12), wherein the SDM parameters comprise a maximum vehicle speed.

Another example (e.g. example 14) relates to a previously-described example (e.g. one or more of examples 11-13), wherein the instructions, when executed by the processing circuitry, further cause the processing circuitry to calculate a navigational adjustment that avoids the hotspot location, and to cause an autonomous vehicle (AV) system of the vehicle to control the vehicle to follow the calculated navigational adjustment.

Another example (e.g. example 15) relates to a previously-described example (e.g. one or more of examples 11-14), wherein the instructions, when executed by the processing circuitry, further cause the processing circuitry to generate the one of more trigger signals further based upon an environmental state or a vehicular state.

Another example (e.g. example 16 relates to a previously-described example (e.g. one or more of examples 11-15), wherein the environmental state comprises one of a time of day or a current weather condition, and wherein the vehicular state comprises a direction of vehicle travel.

Another example (e.g. example 17) relates to a previously-described example (e.g. one or more of examples 11-16), wherein the instructions, when executed by the processing circuitry, further cause the processing circuitry to generate the one of more trigger signals to cause the ADAS to adjust the one or more SDM parameters based upon a gaze of a driver of the vehicle deviating from a predetermined direction for a period of time that exceeds a threshold time period.

Another example (e.g. example 18) relates to a previously-described example (e.g. one or more of examples 11-17), wherein the instructions, when executed by the processing circuitry, further cause the processing circuitry to generate the one or more trigger signals to cause the ADAS to adjust the one or more SDM parameters in response to the location of the vehicle being within a threshold predetermined distance from the hotspot location.

Another example (e.g. example 19) relates to a previously-described example (e.g. one or more of examples 11-18), wherein the instructions, when executed by the processing circuitry, further cause the processing circuitry to increase the threshold predetermined distance when a gaze of a driver of the vehicle deviates from a predetermined direction for a period of time that exceeds a threshold time period.

Another example (e.g. example 20) relates to a previously-described example (e.g. one or more of examples 11-19), wherein the instructions, when executed by the processing circuitry, further cause the processing circuitry to generate the one of more trigger signals to cause the ADAS to adjust the one or more SDM parameters further based upon a vehicle type.

An example (e.g. example 21) relates to a method. The method comprises: determining a location of a vehicle; identifying a hotspot location that is associated with a location at which safety-based warnings that were previously issued by other vehicles meet a predefined criterion; determining a safety driving model (SDM) rule associated with the safety-based warnings; and generating one or more trigger signals based upon the SDM rule and the location of the vehicle with respect to the identified hotspot location, wherein the one or more trigger signals cause an advanced driver-assistance system (ADAS) of the vehicle to adjust one or more SDM parameters of the SDM rule.

Another example (e.g. example 22), relates to a previously-described example (e.g. example 21), wherein the SDM parameters comprise a follow distance.

Another example (e.g. example 23), relates to a previously-described example (e.g. one or more of examples 21-22), wherein the SDM parameters comprise a maximum vehicle speed.

Another example (e.g. example 24), relates to a previously-described example (e.g. one or more of examples 21-23), further comprising: calculating a navigational adjustment that avoids the hotspot location, controlling, via an autonomous vehicle (AV) system of the vehicle, the vehicle to follow the calculated navigational adjustment in response to the one or more trigger signals.

Another example (e.g. example 25), relates to a previously-described example (e.g. one or more of examples 21-24), further comprising: generating the one of more trigger signals further based upon an environmental state or a vehicular state.

Another example (e.g. example 26), relates to a previously-described example (e.g. one or more of examples 21-25), wherein the environmental state comprises one of a time of day or a current weather condition, and wherein the vehicular state comprises a direction of vehicle travel.

Another example (e.g. example 27), relates to a previously-described example (e.g. one or more of examples 21-26), further comprising: generating the one of more trigger signals to cause the ADAS to adjust the one or more SDM parameters based upon a gaze of a driver of the vehicle deviating from a predetermined direction for a period of time that exceeds a threshold time period.

Another example (e.g. example 28), relates to a previously-described example (e.g. one or more of examples 21-27), further comprising: generating the one or more trigger signals to cause the ADAS to adjust the one or more SDM parameters in response to the location of the vehicle being within a threshold predetermined distance from the hotspot location.

Another example (e.g. example 29), relates to a previously-described example (e.g. one or more of examples 21-28), wherein when a gaze of a driver of the vehicle deviates from a predetermined direction for a period of time that exceeds a threshold time period, to increase the threshold predetermined distance.

Another example (e.g. example 30), relates to a previously-described example (e.g. one or more of examples 21-29), wherein the act of generating the one of more trigger signals to cause the ADAS to adjust the one or more SDM parameters comprises: generating the one or more trigger signals further based upon a vehicle type. An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A vehicle, comprising:
a memory configured to store instructions; and
processing circuitry that is part of an advanced driver-assistance system (ADAS) of the vehicle, the processing circuitry being configured to execute the instructions stored in the memory to:
determine a location of the vehicle;
based on the location of the vehicle, identify a hotspot location that is defined based upon a data set that was aggregated over a time period as a result of other vehicles traversing a same fixed geographic region at which a number of safety-based warnings exceeding a predetermined severity level that were previously issued by other vehicles while located within the same fixed geographic region was greater than a predetermined threshold number,
wherein the other vehicles are the same vehicle type as the vehicle,
wherein the hotspot location is defined based upon the number of safety-based warnings exceeding the predetermined severity level issued by vehicles of the same vehicle type as the vehicle such that the hotspot location is specific to the vehicle type,
wherein the location of the hotspot corresponds to the fixed geographic region, which is different than the location of the vehicle;
determine a safety driving model (SDM) rule associated with the safety-based warnings, the SDM rule being part of an SDM comprising SDM parameters that define safety parameters for the vehicle to comply with to facilitate safe driving via the ADAS; and
generate one or more trigger signals based upon the SDM rule and the location of the vehicle with respect to the identified hotspot location,
wherein the one or more trigger signals cause the ADAS to execute a navigational-related operation in accordance with one or more adjusted ones of the SDM parameters of the SDM rule, the SDM parameters being adjusted based upon the identified hotspot location.

2. The vehicle of claim 1, wherein the SDM parameters comprise a follow distance.

3. The vehicle of claim 1, wherein the SDM parameters comprise a maximum vehicle speed.

4. The vehicle of claim 1, wherein the processing circuitry is further configured to execute the instructions stored in the memory to calculate a navigational adjustment that avoids the hotspot location, and
wherein the one or more trigger signals further cause the vehicle to follow the calculated navigational adjustment.

5. The vehicle of claim 1, wherein the processing circuitry is configured to execute the instructions stored in the memory to generate the one or more trigger signals further based upon an environmental state or a vehicular state.

6. The vehicle of claim 5, wherein the environmental state comprises one of a time of day or a current weather condition, and
wherein the vehicular state comprises a direction of vehicle travel.

7. The vehicle of claim 1, wherein the one or more SDM parameters are further adjusted based upon a gaze of a driver of the vehicle deviating from a predetermined direction for a period of time that exceeds a threshold time period.

8. The vehicle of claim 1, wherein the one or more SDM parameters are adjusted in response to the location of the vehicle being within a threshold predetermined distance from the hotspot location.

9. The vehicle of claim 8, wherein the processing circuitry is configured to execute the instructions stored in the memory to increase the threshold predetermined distance when a gaze of a driver of the vehicle deviates from a predetermined direction for a period of time that exceeds a threshold time period.

10. The vehicle of claim 1, wherein the safety-based warnings previously issued by other vehicles comprise audio- and/or video-based warnings that are generated in response to conditions that are detected by the other vehicles to mitigate unsafe conditions for the other vehicles while being operated.

11. The vehicle of claim 1, wherein the hotspot location is a location along a known or predicted future path of the vehicle.

12. The vehicle of claim 1, wherein the hotspot location is within a predetermined driving time from the vehicle based on a current or projected speed of the vehicle and a location of the vehicle.

13. The vehicle of claim 1, wherein the processing circuitry is configured to execute the instructions stored in the memory to generate the one or more trigger signals in response to the hotspot location being within a predetermined distance from the location of the vehicle.

14. The vehicle of claim 1, wherein the processing circuitry is configured to determine the location of the vehicle using an autonomous vehicle (AV) map, and
wherein the AV map comprises a combination of digital map data comprising geographic coordinates and landmarks correlated to respective sets of geographic coordinates in the digital map data.

15. The vehicle of claim 14, wherein the processing circuitry is configured to determine the location of the vehicle based on a position of the vehicle along a planned trajectory of the vehicle within the AV map.

16. The vehicle of claim 14, wherein the processing circuitry is configured to determine the location of the vehicle by determining a position of the vehicle along a planned trajectory of the vehicle within the AV map using an acquired image of one of the landmarks.

17. A non-transitory computer-readable medium having instructions stored thereon that, when executed by processing circuitry of a vehicle, cause the vehicle to:
determine a location of the vehicle;
based on the location of the vehicle, identify a hotspot location that is defined based upon a data set that was aggregated over a time period within a fixed geographic region at which a number of safety-based warnings exceeding a predetermined severity level that were previously issued by other vehicles while located within the fixed geographic region was greater than a predetermined threshold number,
wherein the other vehicles are the same vehicle type as the vehicle, wherein the hotspot location is defined based upon the number of safety-based warnings exceeding the predetermined severity level issued by vehicles of the same vehicle type as the vehicle such that the hotspot location is specific to the vehicle type, wherein the location of the hotspot corresponds to the fixed geographic region, which is different than the location of the vehicle;

determine a safety driving model (SDM) rule associated with the safety-based warnings, the SDM rule being part of an SDM comprising SDM parameters that define safety parameters for the vehicle to comply with to facilitate safe driving via an advanced driver-assistance system (ADAS) of the vehicle;

generate one or more trigger signals based upon the SDM rule and the location of the vehicle with respect to the identified hotspot location, wherein the one or more trigger signals cause the ADAS of the vehicle to execute a navigational-related operation in accordance with one or more adjusted ones of the SDM parameters of the SDM rule, the SDM parameters being adjusted based upon the identified hotspot location.

18. The non-transitory computer-readable medium of claim 17, wherein the SDM parameters comprise a follow distance.

19. The non-transitory computer-readable medium of claim 17, wherein the SDM parameters comprise a maximum vehicle speed.

20. The non-transitory computer-readable medium of claim 17, wherein the instructions, when executed by the processing circuitry, further cause the processing circuitry to calculate a navigational adjustment that avoids the hotspot location, and to cause the vehicle to follow the calculated navigational adjustment.

21. The non-transitory computer-readable medium of claim 17, wherein the instructions, when executed by the processing circuitry, further cause the processing circuitry to generate the one or more trigger signals further based upon an environmental state or a vehicular state.

22. The non-transitory computer-readable medium of claim 21, wherein the environmental state comprises one of a time of day or a current weather condition, and wherein the vehicular state comprises a direction of vehicle travel.

23. The non-transitory computer-readable medium of claim 17, wherein the one or more SDM parameters are further adjusted based upon a gaze of a driver of the vehicle deviating from a predetermined direction for a period of time that exceeds a threshold time period.

24. The non-transitory computer-readable medium of claim 17, wherein the one or more SDM parameters are adjusted in response to the location of the vehicle being within a threshold predetermined distance from the hotspot location.

25. The non-transitory computer-readable medium of claim 24, wherein the instructions, when executed by the processing circuitry, further cause the processing circuitry to increase the threshold predetermined distance when a gaze of a driver of the vehicle deviates from a predetermined direction for a period of time that exceeds a threshold time period.

* * * * *